United States Patent
Leymann et al.

(10) Patent No.: US 6,633,908 B1
(45) Date of Patent: Oct. 14, 2003

(54) ENABLING APPLICATION RESPONSE MEASUREMENT

(75) Inventors: Frank Leymann, Aidlingen (DE); Dieter Roller, Schönaich (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/293,047

(22) Filed: Apr. 16, 1999

(30) Foreign Application Priority Data

May 20, 1998 (EP) .......................................... 98109176

(51) Int. Cl.[7] .......................................... G06F 15/173
(52) U.S. Cl. ...................... 709/224; 709/202; 709/203; 709/220; 709/223; 709/225; 709/226; 709/320; 717/127; 717/131; 717/154; 370/351
(58) Field of Search .................................. 709/202, 203, 709/220, 224, 320, 223, 225, 226; 370/351; 717/127, 131, 154

(56) References Cited

U.S. PATENT DOCUMENTS

| | | | | |
|---|---|---|---|---|
| 5,678,006 A | * | 10/1997 | Valizadeh et al. | 709/220 |
| 5,778,178 A | * | 7/1998 | Arunachalam | 709/203 |
| 5,787,253 A | * | 7/1998 | McCreery et al. | 370/351 |
| 5,796,633 A | * | 8/1998 | Burgess et al. | 702/187 |
| 5,838,919 A | * | 11/1998 | Schwaller et al. | 709/224 |
| 5,872,976 A | * | 2/1999 | Yee et al. | 709/320 |
| 5,881,237 A | * | 3/1999 | Schwaller et al. | 709/224 |
| 5,894,556 A | * | 4/1999 | Grimm et al. | 709/227 |
| 5,937,165 A | * | 8/1999 | Schwaller et al. | 709/224 |
| 6,003,079 A | * | 12/1999 | Friedrich et al. | 709/105 |
| 6,178,449 B1 | * | 1/2001 | Forman et al. | 709/202 |
| 6,374,371 B1 | * | 4/2002 | Lee | 714/42 |

* cited by examiner

Primary Examiner—Kenneth R. Coulter
Assistant Examiner—Hai V. Nguyen
(74) Attorney, Agent, or Firm—William A. Kinnaman, Jr.

(57) ABSTRACT

The present invention relates to the area of systems management teaching means and a method for determining and managing application performance. Application Response Measurement (ARM) assumes that the managed application is a self-instrumented component. This requires invasive changes to existing applications or to add explicitly code to newly written applications. Due to this additional effort this will restrict the area of applicability of ARM. The basic idea of the present invention is to instrument not the application components. The present invention contemplates instrumenting the invocation agent instead, which in turn is responsible to call the application for execution. This solution provides application response measurement without any modification of the application being measured. It is the invocation agent that makes the appropriate ARM calls to furnish the instrumentation on behalf of the application.

13 Claims, 3 Drawing Sheets

ENABLING APPLICATION RESPONSE MEASUREMENT

BACKGROUND OF THE INVENTION

1. Field of the Invention

The present invention relates to the area of systems management. More particularly, the invention relates to means and a method for determining and managing application performance.

2. Description of the Related Art

Business applications today are critical elements of practically every business and organization. Determining whether these applications are functioning properly is the single most important issue for systems management. Many techniques have been created in host-centric environments to address this issue. Because of the rapid migration toward distributed applications, systems management vendors have begun to address distributed application performance with new techniques. There are mainly three approaches to systems management on the market, based on standards from Tivoli, Computer Associates and Microsoft. While all of these approaches can be perceived as defining an industry standard, the Tivoli approach is partially a de jure standard too (i.e. the systems management framework of Object Management Group (OMG)). Many systems management vendors support the Tivoli framework (called TME10) and its Application Management Specification (AMS). This specification enables a consistent development of management-ready applications.

AMS is complemented by the so-called Application Response Measurement (ARM) technique together with its application programming interface (API). The ARM API enables distributed applications to provide critical information about business transactions from the perspective of business operations. This API allows the development of distributed applications which pass information to the systems management environment, which is critical for performance management in terms of business operations. Based on this information, appropriate tools can measure service level agreements and signal early warnings of poor performance etc. in terms of business functions. With this information, systems management software can measure and report service level agreements, receive early warning of poor performance, notify operators or automation routines as soon as a transaction is not completing on time, and help isolate slowdowns. An overview on this technology is given in a white paper available from Tivoli via the Internet at http://www.tivoli.com/o_products/html/body_map_wp.html and incorporated herein by reference.

The monitoring of the status of an application takes place during runtime. Primarily it is used for performance measurement of key application transactions. Exploitation of this technology results in advantages in terms of usability and comprehensibility when compared with the corresponding monitoring capabilities available today for networks, database systems etc. As for providing the same information by other techniques, for example from reports describing network latency, response times, I/Os etc. for the various granular pieces of an application, it is very cumbersome (if possible at all) to derive data from them that can be used to prove the fulfillment of service level agreements between IT departments and their users.

Application response measurement technology assumes that the managed application is a self-instrumented component. This means that the application itself has to use the ARM API to exchange information with the systems management environment. This requires changes to existing applications or explicitly adding code to newly written applications. In spite the benefits of the application response measurement technology it currently will not be the complete solution for all situations, because it requires applications to be instrumented to invoke the API, which requires additional effort, and because the instrumentation is not always possible (the source code is owned by another organization or is no longer available etc.). As admitted by the providers of the technology, this will restrict the area of applicability of ARM. Especially the application provider has to decide which of the systems management environments to adhere to, which in the worst case means that he has to furnish for all of them.

The technology of invocation agents is offered within the area of application integration systems, which support the integration of applications, thus allowing the users to access these applications from a single environment. The integrated applications may even cooperate with one another. Also, depending on the capabilities of the application integration system, it may even support independently designed applications. Even different legacy applications, which have not been developed with the intention of cooperation, can work together through such an approach. Invocation agents can be found in a multitude of runtime environments like in workflow systems, in message brokers or component brokers (like the Common Object Request Broker Architecture (CORBA) standard from OMG ). Further information may be found for instance in the documentation for IBM's workflow system FlowMark available in every IBM sales office. Further information with respect to message and component brokers is given in R. Schulte, Message brokers: A focussed approach to application integration, Gartner Group, Strategic Analysis Report SSA R-401-102, 1996.

The main purpose of an invocation agent is to isolate the rest of the runtime components from the idiosyncrasies of invoking applications which implement the proper business functions. Especially, invocation agents prepare the input for an application as required, set the appropriate security context etc.

SUMMARY OF THE INVENTION

The invention is based on the objective to improve the exploitation of application response measurement technology for all kind of applications and all types of application response measurement systems. In particular the present invention is targeted at a reduction of the instrumentation effort allowing an application to participate within an application response measurement system.

These objectives are achieved by the present invention, which contemplates an invocation agent for invoking an application instance. The invocation agent comprises instrumentation means interacting with an application response measurement system (ARM) to provide response measurement on behalf of the application instance by the ARM.

Application Response Measurement (ARM) assumes that the managed application is a self-instrumented component. Normally this would mean that the application itself has to use the ARM API to exchange information with the systems management environment. Thus this would require invasive changes to existing applications or explicitly adding code to newly written applications. This additional effort would restrict the area of applicability of ARM. Especially the application provider has to decide which of the systems management environments to adhere to, which in the worst case means that he has to furnish for all of them. Even worse, the instrumentation is not always possible; the source code is owned by another organization or is no do longer available etc.

The present invention enables the management and measurement of application performance in systems management environments without special instrumentation of the corresponding applications.

The basic idea of the present invention is not to instrument the application components. The present invention contemplates instrumenting the invocation agent instead, which in turn is responsible for calling the application for execution. This solution provides application response measurement without any modification of the application being measured. As a consequence, no special code has to be added to newly or existing applications to enable them for response measurement. It is the invocation agent that makes the appropriate ARM calls to furnish the instrumentation on behalf of the application. Moreover, as the invocation agent is a generic component independent from the specific application, instrumentation of the invocation component has to take place only once and is available for all applications called by the invocation agent.

All applications (existing or newly written) which are started via invocation agents can be measured without any effort by the application provider. This enablement represents a competitive advantage of the provider of the invocation agent especially from the point of view of large customers with distributed environments using systems management software to manage and monitor applications' responsiveness.

More and more environments are created which use the technology of invocation agents to start applications. Such environments encompass workflow systems, message brokers, object request brokers (for example, IBM's CBConnector and Microsoft's DCOM), and remote procedure calls. Putting instrumentation code necessary to furnish services of the overall environment into the invocation agent will save a lot of money at the application provider side and will thus result in the attractiveness of the target environment for the application provider.

There are different and incompatible ARM products in the market place. Without the present invention the application provider has to decide which of the systems management environments to adhere to, which in the worst case means that he has to furnish for all of them. The present invention allows one to make this decision on the application integration level. Moreover as the invocation agent has the information on which application it has to start, the present invention is flexible enough to allow one to make the decision, which ARM product to involve, on the basis of each individual application. Therefore in accordance with the present invention an application is (to a certain extent) decoupled from the specific ARM product.

Additional advantages are accomplished in a preferred embodiment of the proposed invention in which the instrumentation means of the invocation agent is executed outside of the response measurement scope of the application being measured.

By explicitly performing all invocation agent activities not directly relating to the application execution before starting or after terminating the response measurement, it is guaranteed that the measured data are precise and relate to the application execution and not to the processing of the invocation agent.

Additional advantages are accomplished in a preferred embodiment of the proposed invention in which the instrumentation means further comprises application response measurement setup means for requesting the ARM to measure the response of the application instance and application response measurement termination means for requesting the ARM to terminate the response measurement.

Through these two distinctive means the invocation agent is enabled to precisely control the "time window", in which the ARM will associate the response measurement data to the application. Such a feature allows the invocation agent to perform extra processing, which will not enter the response measurement data of the application. Thus it is guaranteed that the measured data are precise and relate to the application execution and not to the processing of the invocation agent.

Additional advantages are accomplished in a preferred embodiment of the proposed invention in which the application response measurement setup means further identifies a transaction of the application instance to the ARM to be measured. The application response measurement termination means further identifies the transaction to the ARM for which the response measurement is to be terminated.

The present invention makes maximal use of information available to the invocation agent. As the invocation "knows" which application/transaction it has to invoke it is also able to share this information with the ARM. The ARM is thus able to associate the measured data with the correct application/transaction.

Additional advantages are accomplished in a preferred embodiment of the proposed invention in which the instrumentation means further comprises determination means for determining whether the application instance is to be measured by the ARM. Selectively based on such determination the application response measurement setup means and the application response measurement termination means are executed.

The present invention makes maximal use of information available to the invocation agent. An application typically is integrated within an larger environment from within the invocation agent starts the application. Configuration information indicates which of the applications is to be measured. Through the determination means the invocation agent approach is a flexible approach allowing one to trigger response measurement for certain applications while other applications do not participate in the response measurement process. This teaching would even be able to involve different ARM systems for different applications for response measurement.

Additional advantages are accomplished in a preferred embodiment of the proposed invention in which the invocation agent is part of a workflow management system, or part of a message broker.

Due to the flexibility of the present invention, it can be perfectly applied to two modern and important environments, which will play an important role in the future.

The present invention also contemplates a method of providing a response measurement for an application instance by an application response measurement system (ARM). In accordance with this aspect of the invention, in a first step an invocation agent requests the ARM to measure the response of the application instance to provide response measurement on behalf of the application instance by the ARM. In a second step the invocation agent invokes the application instance, and in a third step the invocation agent requests the ARM to terminate the response measurement.

Benefits related to this teaching have been discussed above.

Additional advantages are accomplished in a preferred embodiment of the proposed invention in which in the first step the invocation agent further identifies a transaction of the application instance to the ARM to be measured, and wherein in the third step the invocation agent further identifies to the ARM the transaction for which the response measurement is to be terminated.

Benefits related to this teaching have been discussed above.

Additional advantages are accomplished in a preferred embodiment of the proposed invention in which the invocation agent determines before executing the first step whether the application instance is to be measured by the ARM. Moreover it is taught that selectively based on the determination the first and the third step are executed.

Benefits related to this teaching have been discussed above.

Additional advantages are accomplished in a preferred embodiment of the proposed invention in which the invocation agent is part of a workflow management system, or wherein the invocation agent is part of a message broker.

Benefits related to this teaching have been discussed above.

DESCRIPTION OF THE PREFERRED EMBODIMENT

Though the present specification of the invention is outlined on the basis of a specific application response measurement (ARM) system, namely Tivoli's ARM product, the term "application response measurement" should be interpreted from a generic point of view as covering also other implementations.

Throughout the specification the terms "application" and "transaction" are used with interchangeable significance. Excluded are situations where the context indicates a different meaning.

1. Introduction to Application Response Measurement

Figure 1:
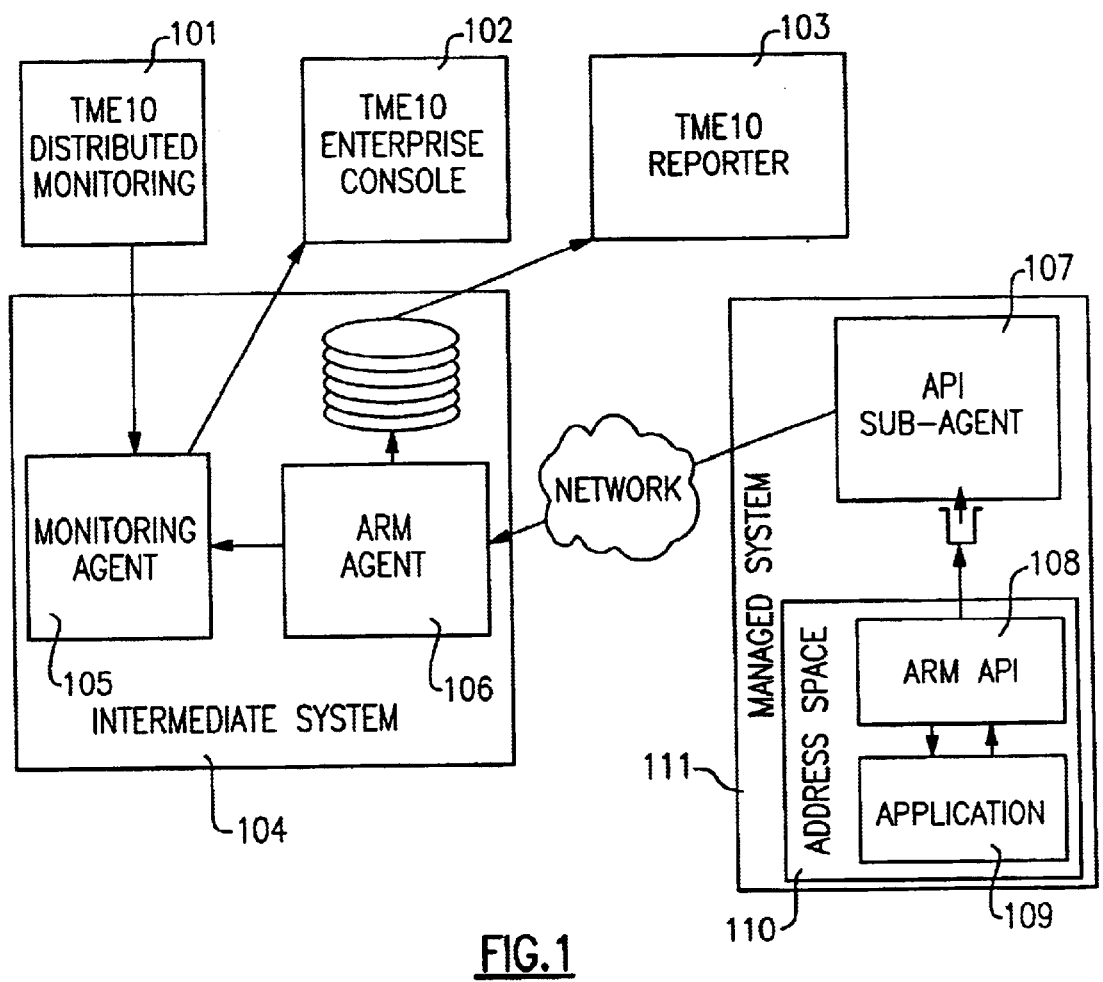
FIG. 1 is a diagram reflecting a scenario of exploiting application response measurement technology by an application based on the example of Tivoli's ARM being part of TME10 according state of the art.

Using Tivoli's system management product set, Tivoli Management Environment (TME), as an example, FIG. 1 gives an overview of application response measurement technology according to the existing art.

Availability and performance management is the process of monitoring an application and its environment while the application is running, and automatically taking preventive or corrective actions.

Periodically checking an application and the infrastructure on which it depends is a good way to detect problems as they occur or as they develop. Tivoli Distributed Monitoring 101 can test a range of key measurements, including measurements from user-provided scripts. The results of these measurements are tested by Tivoli Distributed Monitoring 101 against user-specified criteria. Based on the results of the test, automation scripts can be invoked, operators notified, or events forwarded to a Tivoli Enterprise Console 102. Control of all these measurements and responses can be accomplished from a central console.

Managing the vast amount of data from a complex environment in real time requires automated processing. The data must be filtered and correlated to other data, and responses must be automatically executed. Tivoli Distributed Monitoring 101 provides this function at a local level or across a network or enterprise, offering sophisticated rule-based analysis of different applications, systems, databases, and networks. To execute the responses, Tivoli Enterprise Console 102 invokes tasks across many different platforms, protected by a strong security.

An ARM agent 106 for Tivoli Distributed Monitoring 101 monitors individual application transactions. Applications 109 call the ARM agent 106 at the beginning and end of each transaction using an ARM API 108. These calls are introduced into the application by introducing instrumentation to the application, i.e. by invasive source modifications of the application. Within the beginning and end of the transaction TME10 is providing the application response measurement for that particular transaction. Typically the application 109 being measured executes within an address space 110 on a system 111 called the managed system. By addressing the ARM API 108 the application 109 indirectly interacts via an API Subagent 107, being the TME representant on the managed system, with the ARM Agent 106 for monitoring purposes.

ARM API 108 runs in the address space 110 of the application 109. Its only function is to capture the key data and a timestamp, put this data on a queue, and then return control to the application 109. API Subagent 107 runs asynchronously as its own process. This subagent manages the data (calculates response times, checks thresholds, etc.). Availability monitoring is provided by Tivoli Distributed Monitoring 101, which enables central, policy-based configuration and deployment of monitors and responses for groups of machines. Tivoli ARM agents 106 send data to Tivoli Distributed Monitoring 101, which can execute local automation routines in response to events. Events can also be forwarded to Tivoli Enterprise Console 102. Several monitors are provided, including average and maximum response time, transaction counts, hung transactions, and failed transactions. Summary records are logged to a sequential file for later processing. Tivoli Reporter 103 processes log files (including the ARM data written by Tivoli Distributed Monitoring 101) by collecting and filtering the data based on rules, then stores the data in a Structured Query Language (SQL) database. This data can be used to track past performance and availability and to project future requirements. Graphical or text reports about availability, performance, events, accounting, and inventory can be generated and displayed or printed.

The architecture is three-tier in nature, consisting of the managed system 111, an intermediate system 104 and the monitoring and reporting facilities 101–103, which might by executing on the same or on different systems. In addition to containing ARM Agent 106, intermediate system 104 also contains a monitoring agent 105 coupling ARM Agent 106 to Tivoli Distributed Monitoring 101 and Tivoli Enterprise Console 102. ARM Agent 106 is also coupled to API Subagent 107 of managed system 111 by a network as shown in FIG. 1.

Because the application 109, the transaction, and (optionally) the user are known, and a transaction status can be provided, sufficient information is available to answer management questions such as the following:

Are application transactions hanging or failing?
Rather than waiting for phone calls from dissatisfied users, operators can receive instantaneous notification when a transaction is not completing satisfactorily, and appropriate steps can be taken to remedy the situation. Alternatively, this information can be logged and accurate counts can be tracked over time. Eliminating this guesswork helps both the users of the applications and the administrators responsible for making sure they are meeting the requirements of the business.

What is the response time?
Having satisfactory response times is second in importance only to knowing whether a transaction is hanging or failing. (From the user's perspective, only two things really matter: is it working, and how long is it taking?) Response times are important elements in service level agreements, and were almost taken for granted with host-centric applications. Monitoring response times has rarely been implemented with distributed applications because of the difficulties involved.

Who uses the application, and how many of which transactions are used?
Because the ARM API is called for each transaction, and each transaction and (optionally) each user is identified, an accurate understanding of actual workload can be obtained. Incorrect assumptions about the actual workload is one of the biggest contributors to inadequate capacity planning. Instrumenting to the ARM API takes the guesswork away. This same information can be used for charge-back accounting.

Where are the bottlenecks?
If response times are unsatisfactory, where is the time being spent? By instrumenting subtransactions in addition to the main transactions visible to the user, it is easy to determine where the most time is spent.

How can my application be tuned to perform better?
By understanding how subtransactions combine to result in total application performance, administrators can take steps to minimize the execution paths that require the most time without requiring application redesign and rework. For example, a faster communications link might be installed, a server might be moved onto the network segment of its most frequent users, or a larger system might be installed.

2. Minimizing Instrumentation Effort for Application Response Measurement

Application Response Measurement (ARM) assumes that the managed application 109 is a self-instrumented component. This means that the application 109 itself has to use the ARM API 108 to exchange information with the systems management environment (refer to FIG. 1). This requires invasive changes to existing applications or to add explicitly code to newly written applications. Due to this additional effort this will restrict the area of applicability of ARM. Especially the application provider has to decide which of the systems management environments to adhere with which in the worst case means that he has to furnish for all of them.

The present invention allows to enable the management and measurement of application performance in systems management environments without special instrumentation of the corresponding applications.

The basic idea of the present invention is to instrument not the application components. The present invention contemplates instrumenting the invocation agent instead, which in turn is responsible for calling the application for execution. This solution provides application response measurement without any modification of the application being measured. As a consequence, no special code has to be added to newly or existing applications to enable them for response measurement. It is the invocation agent that makes the appropriate ARM calls to furnish the instrumentation on behalf of the application (see FIG. 2). Moreover as the invocation agent is a generic component independent from the specific application, instrumentation of the invocation component has to take place only once and is available for all application called by the invocation agent.

Figure 2:
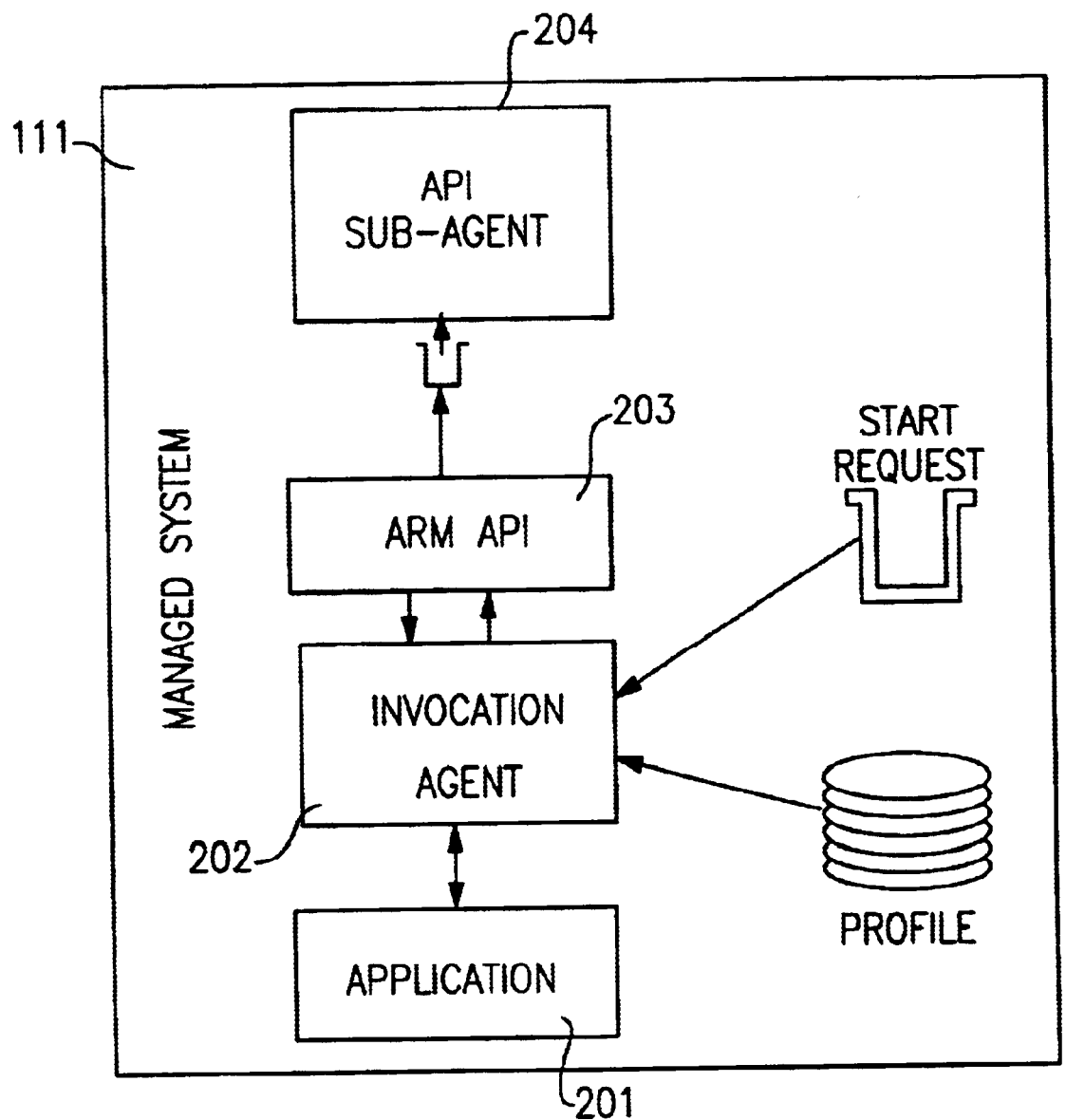
FIG. 2 visualizes the teaching of the present invention for response measure enablement of an application by an application response measurement system.

FIG. 2 depicts this teaching of the invention. The managed system 111 corresponds to that of FIG. 1. In accordance with the present invention, an invocation agent 202 invokes an application instance 201. The invocation agent 202 comprises the instrumentation for application response measurement. Through this instrumentation the invocation agent 202 interacts with an application response measurement system 203, 204 comprising an ARM API 203 and API Subagent 204 to provide response measurement on behalf of the application instance 201 by the ARM.

Invocation agents can be found in a multitude of runtime environments like in workflow systems, in message brokers or in component brokers (like the Common Object Request Broker Architecture (CORBA) standard from OMG). The main purpose of an invocation agent is to isolate the rest of the runtime components from the idiosyncrasies of invoking applications which implement the proper business functions. Especially, invocation agents prepare the input for an application as required, set the appropriate security context etc. As additional function, the present invention proposes to let an invocation agent perform whatever is necessary to communicate with the target systems management environment to enable response management for the invoked application.

Figure 3:
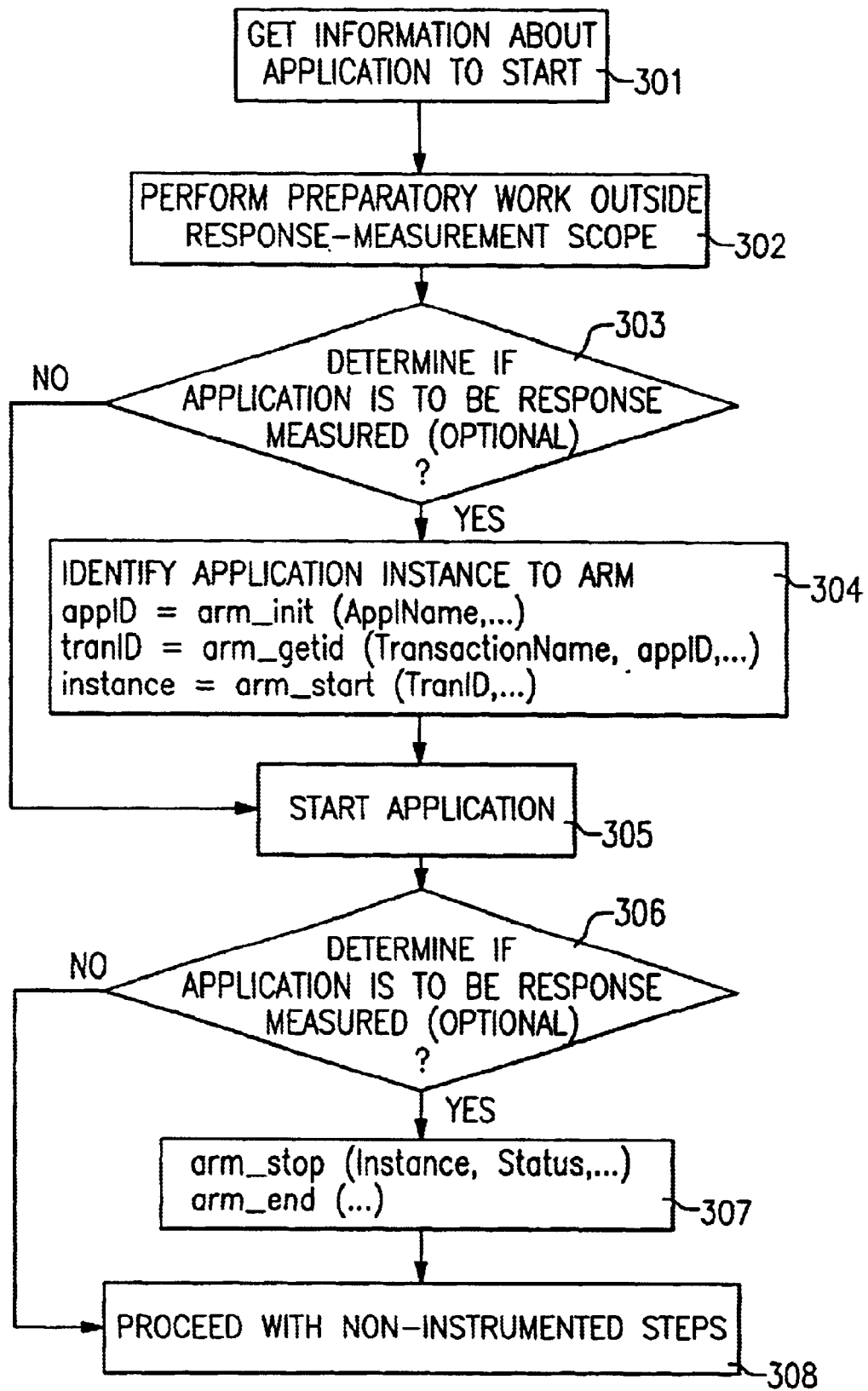
FIG. 3 depicts a more detailed view of the preferred embodiment of the present invention.

As one possible embodiment of the present invention, the preferred example of instrumentation is based on Tivoli's application response measurement technology ARM. The following description together with FIG. 3 sketches the contents and sequence of the individual instrumentation steps to be performed by an invocation agent 202 to furnish response measurement on behalf of the applications 201 to be measured:

1. Get information about the application 201 to start (step 301).
    This information is typically passed to the invocation agent 202 by the service initiating the start of the application 201, e.g. the workflow server or the message broker.
2. Perform all preparatory work required to start the application 201 (step 302).
    One has to make sure that as little work as possible done by the invocation agent 202 is interpreted as work done by the application 201 to make the measurement precise enough. As a consequence, all work that the invocation agent 202 has to do to enable itself to finally start the application 201 has to be performed before the calls to the ARM are made which start the response measurement for the application 201. In other words, the preparatory activities have to be executed outside of the response measurement scope of the application 201 being measured.
3. Determine whether the application 201 is to be measured (optional).
    This information can come from various sources. In a workflow environment it could be a property of the corresponding activity and is passed by the workflow server as part of the invocation request. In a message broker environment it could be specified by a rule governing the processing of a particular message type. The invocation agent 202 itself could have access to a database of profiles of applications 201 specifying their properties with respect to response measurement etc.

4. If the application 201 is to be measured, introduce the application to the ARM:

appID=arm_init(Application_Name, [User_ID], . . . )

This call establishes a system-wide unique name for the running instance of the application 201 to be created soon by the invocation agent 202. arm_init defines the application name and (optionally) the user ID. Typically, this call is executed once. The application name and user ID are specified as character strings. The main reasons for defining an application 202 are to help organize the information and to minimize the problem of duplicate transaction names defined in different applications. The return code from arm_init is a unique identifier generated by the agent; it is passed as a parameter on arm_getid and arm_end calls:

tranID=arm_getid(Transaction_Name, appID, . . . )

If the granularity of the invoked application 201 is known (i.e. the various "transactions" performed by it), response measurement can be initiated at a lower level of granularity. If now finer level of granularity is to be established, Transaction_Name should be set to Application_Name. arm_getid defines the transaction name and (optionally) details about the transaction. Multiple transaction names can be defined for each application. The arm_getid call is called once for each type of transaction. A transaction name needs to be unique only within an application. The combination of application name and transaction name uniquely identifies a transaction type. The identifier returned on arm_init is passed as a parameter on arm_getid so that the transaction name is associated with the correct application. The return code from arm_getid is a unique identifier generated by the agent.

It is passed as a parameter on arm_start calls. This identifier is unique for all transactions across all applications within one system:

instance=arm_start(tranID, . . . )

This finally signals to the systems management environment that the instance of the application introduced before has started (which is in fact not true because this happens in the next step). arm_start indicates that an instance of a transaction has begun execution. Contrast this with arm_getid, which defines a transaction name (essentially the transaction class) during initialization, but does not indicate that a transaction has been executed. The identifier returned on arm_getid is passed as a parameter on arm_start so that the agent can know which type of transaction has just started. Multiple instances of the same transaction can execute simultaneously on the same system. To identify each transaction, the return code from arm_start is a unique identifier generated by the agent. This identifier is unique within a system across all instances of all transactions of all applications. The transaction instance is the fundamental entity that the ARM API monitors. Beginning with this call the ARM performs application response measurement on behalf of the application.

5. Start the application 201 (step 305).

6. When the application 201 returns to the invocation agent 202, determine whether the application 201 is to be measured (optional) (step 306).

In an optimal solution the invocation agent 202 should cache this information so that there is no need to access this information in persistent store to avoid I/O. This I/O would otherwise be counted by the systems management environment as work done by the application 201 because it is not before the next step in which the invocation agent informs the ARM that the application has terminated.

7. If the application 201 is to be measured, immediately inform the ARM about the termination of the application (step 307):

arm_stop(instance, status, . . . )

arm_end(. . . )

arm_stop indicates that an instance of a transaction has completed. The identifier returned on arm_start is passed as a parameter to indicate which instance of a transaction has stopped. A status parameter is also passed. arm_end indicates that the invocation agent 202 will not make further calls to the ARM API 203 on behalf of the application 201. This call typically is used when an application 201 is shut down. Any information about transactions that are in-process (an arm_start has been issued but there is not yet a corresponding arm_stop) is discarded.

8. Perform all other work required (rest of non-instrumented invocation agent)

It has to be noted that some of the overhead represented by the invocation agent 202 is measured as part of the work performed by the application 201 invoked and falsifies the real data. In environments in which applications 201 are typically started via invocation agents 202 this would often not be a problem, as each execution of the invocation agent 202 contributes the same share to the measured data.

3. Advantages

All applications 201 (existing or newly written) which are started via invocation agents 202 can be response time measured without any effort by the application provider. This enablement represents a competitive advantage of the provider of the invocation agent 202 especially from the point of view of large customers with distributed environments using systems management software to manage and monitor applications responsiveness.

More and more environments are created which use the technology of invocation agents to start applications. Such environments encompass workflow systems, message brokers, object request brokers (for example, IBM's CBConnector and Microsoft's DCOM), remote procedure calls. Putting instrumentation code necessary to furnish services of the overall environment into the invocation agent will save a lot of money at the application provider side and will thus result in the attractiveness of the target environment for the application provider.

There are different and incompatible ARM products in the market place. Without the present invention the application provider has to decide which of the systems management environments to adhere to, which in the worst case means that he has to provide for all of them. The present invention allows one to make this decision on the application integration level. Moreover, as the invocation agent has the information which application it has to start the present invention is flexible enough to allow to make the decision, which ARM product to involve, on the basis of each individual application.

4. Acronyms

AMS Application Management Specification (Tivoli)
ARM Application Response Measurement (Tivoli)
OMG Object Management Group
TME Tivoli Management Environment

What is claimed is:

1. An invocation agent for providing response measurement for an application instance by an application response measurement system (ARM), said invocation agent being separate from said application instance and being capable of invoking any of a plurality of application instances, said invocation agent comprising:

application response measurement setup means for requesting said ARM to measure the response of said application instance to provide response measurement on behalf of said application instance by said ARM;

invocation means for invoking said application instance; and application response measurement termination means responsive to completion of said application instance for requesting said ARM to terminate said response measurement.

2. An invocation agent according to claim 1, wherein said invocation agent performs all work preparatory to invoking said application instance outside of a response measurement scope of said application instance.

3. An invocation agent according to claim 1:

wherein said application response measurement setup means further identifies a transaction of said application instance to said ARM to be measured; and wherein said application response measurement termination means further identifies a transaction to said ARM for which said response measurement is to be terminated.

4. An invocation agent according to claim 1:

wherein said invocation agent further comprises determination means for determining whether said application instance is to be measured by said ARM; and wherein selectively based on such determining said application response measurement setup means and said application response measurement termination means are executed.

5. An invocation agent according to claim 1, wherein said invocation agent is part of a workflow management system.

6. An invocation agent according to claim 1, wherein said invocation agent is part of a message broker.

7. An invocation agent according to claim 1, wherein said invocation agent is part of a component broker.

8. A method for providing response measurement for an application instance by an application response measurement system (ARM):

wherein in a first step an invocation agent requests said ARM to measure the response of said application instance to provide response measurement on behalf of said application instance by said ARM, said invocation agent being separate from said application instance and being capable of invoking any of a plurality of application instances;

wherein in a second step said invocation agent invokes said application instance; and wherein in a third step, in response to completion of said application instance, said invocation agent requests said ARM to terminate said response measurement.

9. A method according to claim 8:

wherein in said first step said invocation agent further identifies a transaction of said application instance to said ARM to be measured; and wherein in said third step said invocation agent further identifies to said ARM a transaction for which said response measurement is to be terminated.

10. A method according to claim 8:

wherein said invocation agent determines before executing said first step whether said application instance is to be measured by said ARM; and wherein selectively based on such determining said first and said third steps are executed.

11. A method according to claim 8, wherein said invocation agent is part of a workflow management system.

12. A method according to claim 8, wherein said invocation agent is part of a message broker.

13. A method according to claim 8, wherein said invocation agent is part of a component broker.

* * * * *